(12) United States Patent
Militello et al.

(10) Patent No.: US 6,747,384 B2
(45) Date of Patent: Jun. 8, 2004

(54) ALTERNATOR HYBRID MAGNET ROTOR DESIGN

(75) Inventors: Anthony Militello, Ypsilanti, MI (US); Michael Timothy York, Chelsea, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 30 days.

(21) Appl. No.: 10/057,034

(22) Filed: Jan. 24, 2002

(65) Prior Publication Data

US 2003/0137212 A1 Jul. 24, 2003

(51) Int. Cl.⁷ .............................................. H02K 21/12
(52) U.S. Cl. ................... 310/156.08; 310/263
(58) Field of Search ................... 310/263, 91, 156.08

(56) References Cited

U.S. PATENT DOCUMENTS

| | | |
|---|---|---|
| 5,539,265 A | 7/1996 | Harris et al. |
| 5,543,676 A * | 8/1996 | York et al. ................... 310/263 |
| 5,780,953 A | 7/1998 | Umeda et al. |
| 5,892,313 A * | 4/1999 | Harris et al. ................ 310/263 |
| 5,907,209 A | 5/1999 | Ishida |
| 5,925,964 A | 7/1999 | Kusase et al. |
| 5,973,435 A | 10/1999 | Irie et al. |
| 6,011,343 A | 1/2000 | Taniguchi |
| 6,034,464 A | 3/2000 | Asao |
| 6,037,695 A | 3/2000 | Kanazawa et al. |
| 6,144,138 A * | 11/2000 | Ragaly ........................ 310/263 |
| 6,172,441 B1 | 1/2001 | York et al. |
| 6,307,297 B1 * | 10/2001 | Bramson et al. ............ 310/263 |
| 6,426,581 B1 | 7/2002 | York et al. |

FOREIGN PATENT DOCUMENTS

| | | |
|---|---|---|
| EP | 0 269 216 A1 | 6/1988 |
| EP | 0 834 979 A3 | 4/1998 |
| EP | 1 065 776 A1 | 1/2001 |
| GB | 2 307 110 A | 5/1997 |

* cited by examiner

*Primary Examiner*—Tran Nguyen
(74) *Attorney, Agent, or Firm*—Brinks Hofer Gilson & Lione

(57) ABSTRACT

A rotor assembly for an alternator includes an electrical wire defining an excitation winding. A first pole piece and a second pole piece each have a generally circular body defining an axis of rotation and an outer radial periphery. A plurality of pole fingers are spaced radially about and extend axially from the outer radial periphery of each pole piece parallel to the axis of rotation. Each pole piece includes a plurality of mounting surfaces spaced radially about the outer radial periphery between the pole fingers. A plurality of permanent magnets are positioned on the mounting surfaces. A plurality of covers include tabs extending therefrom and are adapted to substantially encase one of the permanent magnets. The mounting surfaces of the first and second pole pieces include ribs which are adapted to engage the tabs to secure the covers to the mounting surfaces.

17 Claims, 7 Drawing Sheets

ALTERNATOR HYBRID MAGNET ROTOR DESIGN

FIELD OF INVENTION

The invention relates to an automotive electrical alternator, and particularly to an alternator having a rotor assembly of a hybrid design including permanent magnets mounted thereon.

BACKGROUND OF THE INVENTION

This invention is related to an electrical alternator, particularly adapted for use in motor vehicle applications including passenger cars and light trucks. These devices are typically mechanically driven using a drive belt wrapped on a pulley connected to the crankshaft of the vehicle's internal combustion engine. The belt drives a pulley on the alternator which rotates an internal rotor assembly to generate alternating current (AC) electrical power. This alternating current electrical power is rectified to direct current (DC) and supplied to the motor vehicle's electrical bus and storage battery.

While alternators have been in use in motor vehicles for many decades, today's demands on motor vehicle design, cost, and performance have placed increasing emphasis on the design of more efficient alternators. Today's motor vehicles feature a dramatic increase in the number of electrical on-board systems and accessories. Such electrical devices include interior and exterior lighting, climate control systems; increasingly sophisticated power train control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the vehicle's electrical system demands vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its mass which relates to the vehicle's fuel mileage.

In addition to the need of providing higher electrical output, designers of these devices further strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

One method which has been used to increase the power output of conventional electric alternators is to mount one or more permanent magnets onto an outer surface of the rotor to produce a significantly stronger magnetic field. The combined effect of the permanent magnets and the wound field coil enables the machine to produce substantially more electrical power output. It is difficult, however, to secure the permanent magnets onto the rotor because the rotor rotates at speeds of up to 25,000 RPM and is exposed to various environmental conditions.

One method of securing the magnets onto the rotor is to lengthen the inter-meshing fingers of the pole pieces so that they extend outward over the magnets to hold the magnets onto the adjacent pole piece. This however adds stress to the fingers when the rotor is spinning rapidly which causes the fingers to flex outward into the gap between the rotor and the stator. The distance between the rotor and the stator is controlled very closely because the closer the rotor and stator are to one another, the higher the electrical power output will be. Flexation of the fingers outward will force the alternator to be designed with a larger gap which will reduce the power output of the alternator.

Further, the permanent magnets are generally brittle and require expensive grinding operations to meet size tolerances, thereby making it difficult and expensive to shape the permanent magnets in a manner that will allow the permanent magnets to be locked onto the rotor.

Therefore, there is a need for an alternator rotor assembly having permanent magnets mounted thereon to increase the power output of the alternator, wherein the permanent magnets are mounted onto the rotor in a way that does not affect the structural robustness of the rotor and does not require tight tolerances on the size and shape of the permanent magnets.

SUMMARY OF THE INVENTION

In a first aspect of the present invention, a rotor assembly includes first and second poles each having a plurality of pole fingers spaced radially about and extending axially from a periphery of the poles and a plurality of mounting surfaces spaced radially about and between the pole fingers. In the assembled condition, the pole pieces fit together such that the pole fingers interleave in the well known "claw-pole" configuration. Permanent magnets are positioned on the mounting surfaces and covers are provided to substantially encase the permanent magnets and to secure the permanent magnets to the pole pieces.

In another aspect of the present invention, each of the covers includes tabs extending therefrom and the mounting surfaces include ribs adapted to be staked over the tabs to secure the covers, with the permanent magnets encased therein, to the mounting surfaces.

In still another aspect of the present invention, each of the pole fingers of the first pole piece includes a distal end and extends between the pole fingers of the second pole piece, the distal ends being positioned over the mounting surfaces of the second pole piece and each of the pole fingers of the second pole piece includes a distal end and extends between the pole fingers of the first pole piece, the distal ends being positioned over the mounting surfaces of the first pole piece, the distal ends being adapted to engage the covers to further secure the permanent magnets onto the mounting surfaces.

In yet another aspect of the present invention the permanent magnets are secured within the covers with an adhesive.

In still another aspect of the present invention the covers are made from a non-magnetic material.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

Figure 1:
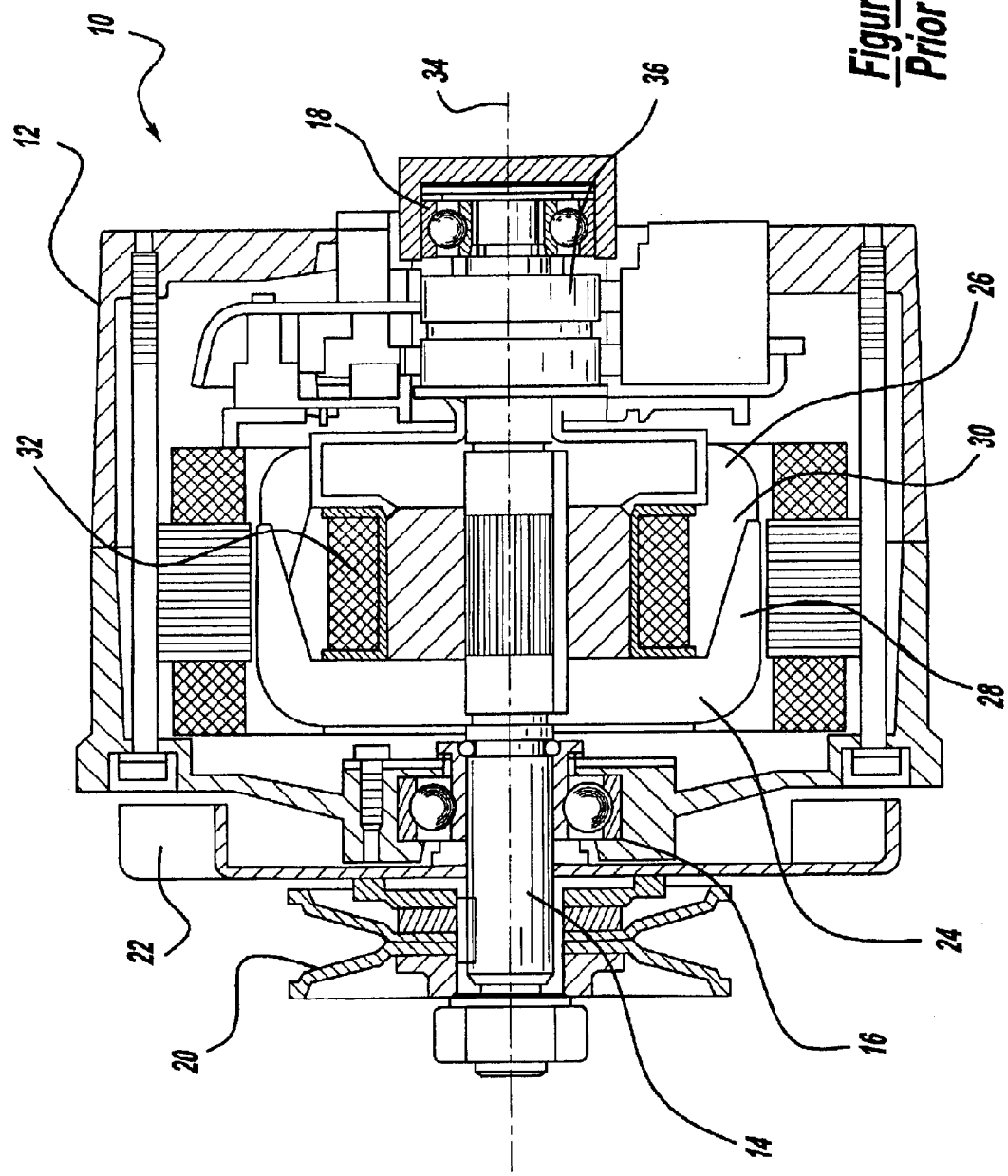
FIG. 1 is a cross sectional view of a typical prior art electrical alternator.

In order to provide a framework for a further detailed description of the preferred embodiments of this invention, FIG. 1 are presented illustrating a prior art electrical alternator configuration. That figure illustrates electrical alternator 10 enclosed with housing 12. Alternator rotor shaft 14 is supported by rolling element bearings 16 and 18. Belt driven pulley 20 is fastened to the protruding front end of rotor shaft 14. Fan 22 rotates with shaft 14 and provides cooling airflow for removing heat from alternator 10. Front and rear alternator pole pieces 24 and 26, respectively, rotate with shaft 14 and have extending claw fingers 28 and 30, respectively. Fingers 28 and 30 interlace to create the well known "claw pole" rotor configuration. Excitation winding 32 is carried within the cavity formed between pole pieces 24 and 26. A DC excitation signal is applied to excitation winding 32 through a pair of slip rings 34 and 36, and associated brushes.

Rotor assembly 38 which includes pole pieces 24 and 26, winding 32, and slip rings 34 and 36, produces an alternating polarity magnetic field which rotates with rotation of the rotor assembly. Although a DC excitation signal is applied to slip rings 34 and 36, the interlacing of alternating poles 24 and 26 creates an alternating polarity magnetic field as presented to the windings of stationary core 40 located radially around rotor assembly 38. The movement of the alternating polarity magnetic field presented by rotor assembly 38 across the windings of core 40 generates electricity in a well-known manner.

Electrical energy output by electrical alternator 10 generated within core 40 is directed to rectifying diodes (not shown) and perhaps further filtering and power conditioning devices before being connected with the vehicle's electric distribution bus. Sophisticated control systems, also known as voltage regulators, are used to apply an appropriate level of DC voltage to excitation windings 32 to generate the desired RMS value of the outputted alternating current from alternator 10, which can be in single phase or multi-phase form, depending on the winding design of core 40.

Figure 2:
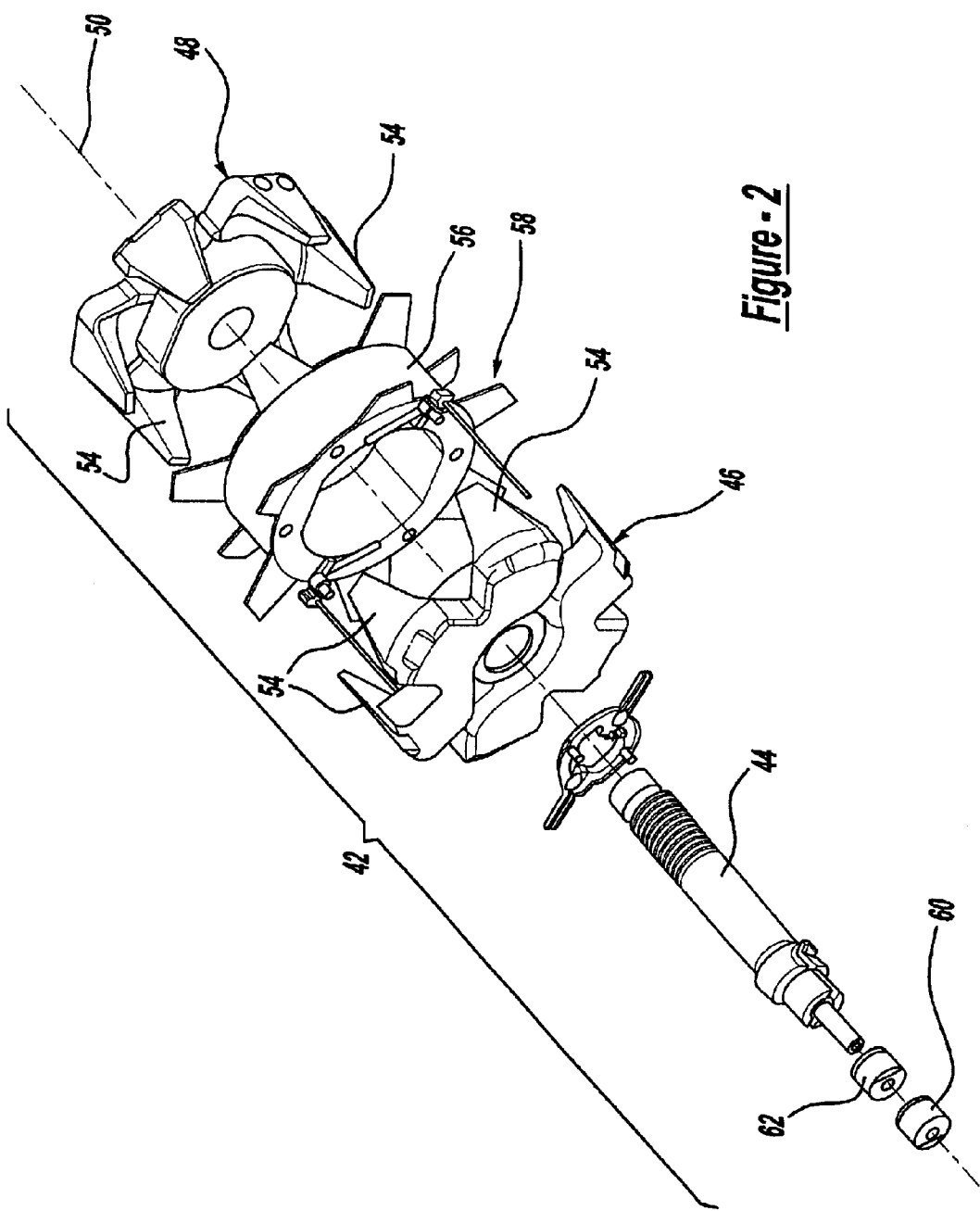
FIG. 2 is an exploded view of a rotor assembly of the prior art electrical alternator.

Now referring to FIG. 2, a rotor assembly of the present invention is shown generally at 42. The rotor assembly 42 includes a rotor shaft 44 which is supported by rolling element bearings. First and second pole pieces 46 and 48, respectively, each have a generally circular body and define an axis of rotation 50 and a radial outer periphery 52. The first and second pole pieces 46 and 48 rotate with the shaft 44 and have extending pole fingers 54. An excitation winding 56 is carried on a bobbin 58 within the cavity formed between poles 46 and 48. A DC excitation signal is applied to the excitation winding 56 through a pair of slip rings 60 and 62, and associated brushes.

Figure 3:
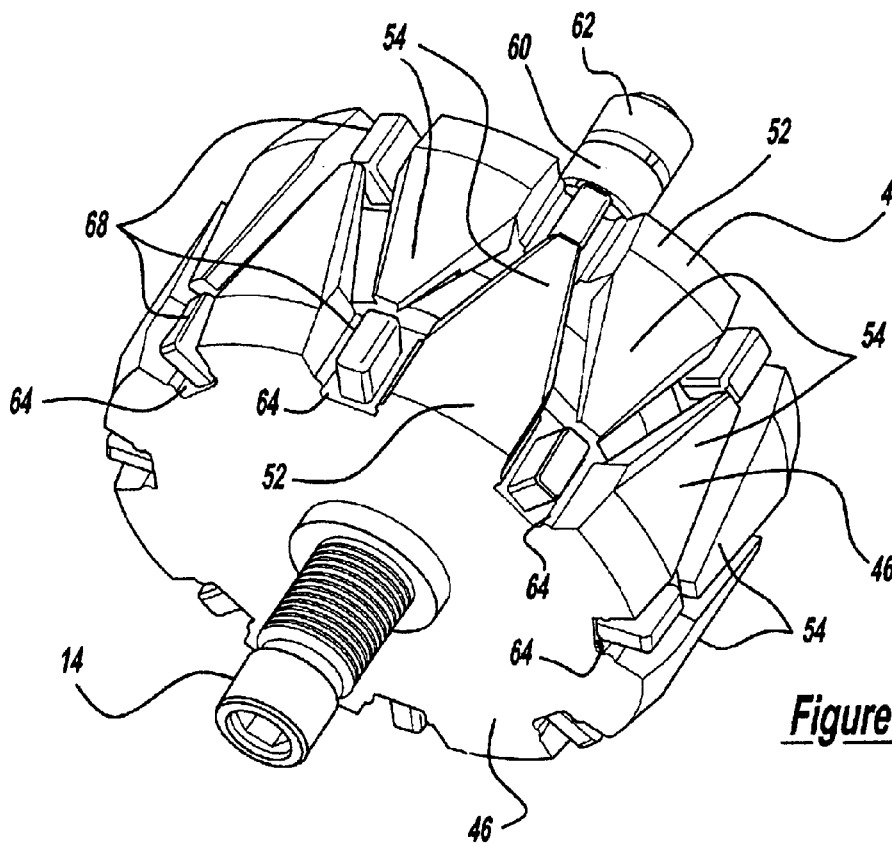
FIG. 3 is a perspective view of the rotor assembly shown with permanent magnets placed thereon.

The pole fingers 54 are spaced radially about and extend axially from the radial outer periphery 52 of the first and second pole pieces 46 and 48, parallel to the axis of rotation 50. The first and second pole pieces 46 and 48 each further include a plurality of mounting surfaces 64 spaced radially about the radial outer periphery 52 between the pole fingers 54. Permanent magnets 66 are placed at the periphery 52 of each of the first and second pole pieces 46 and 48, wherein one of the permanent magnets 66 is positioned on each of the mounting surfaces 64 of the first and second pole pieces 46 and 48 as shown in FIG. 3.

Figure 5:
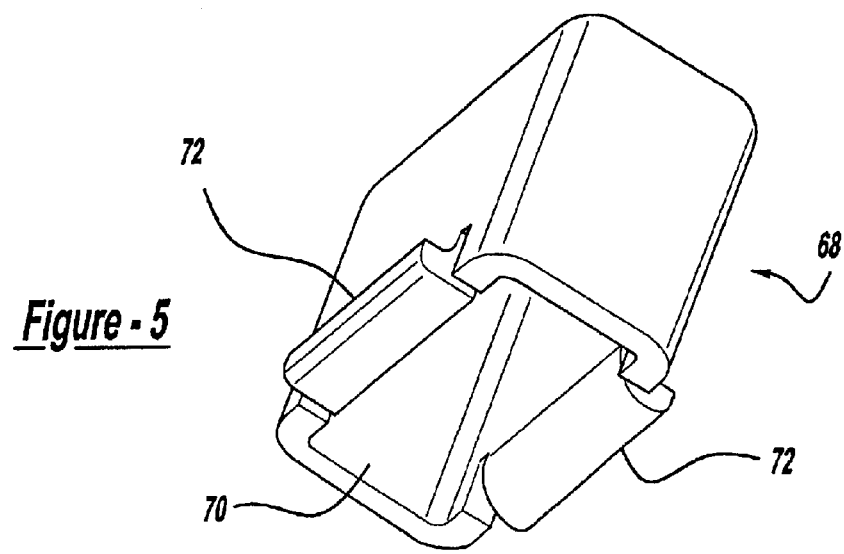
FIG. 5 is a perspective view of a cover of the present invention.
Figure 4:
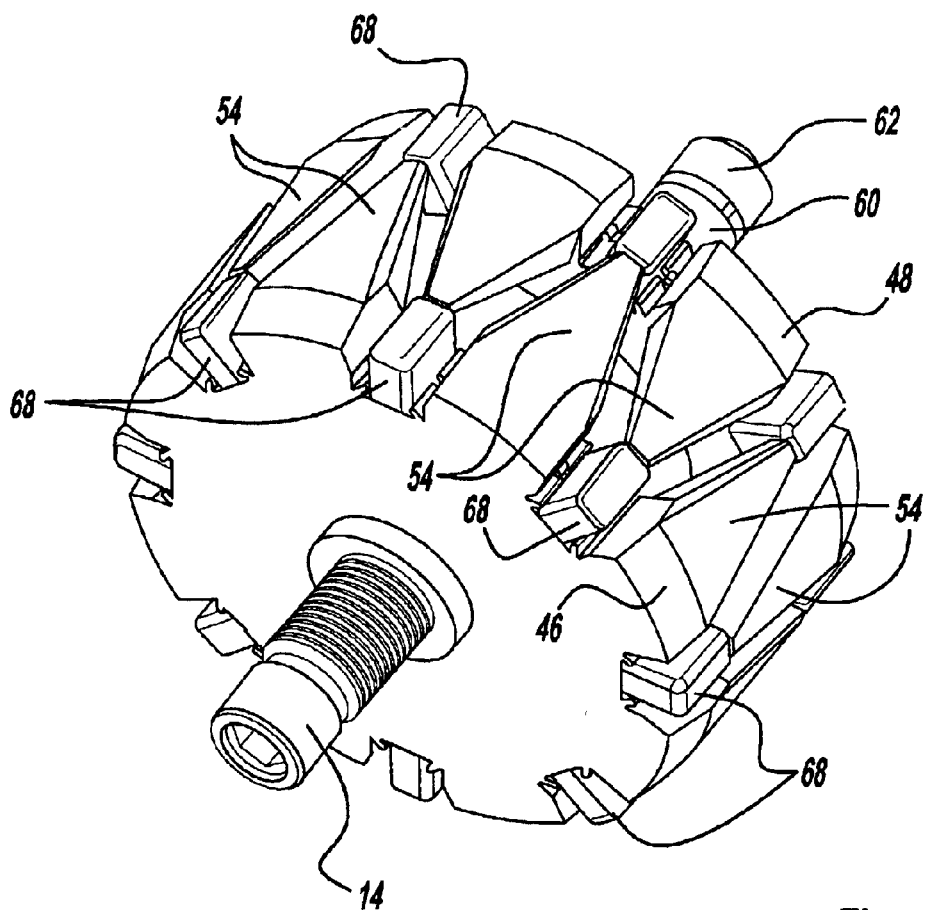
FIG. 4 is the view of FIG. 3 shown with cover in place over the permanent magnets.

Referring to FIG. 4, in the preferred embodiment, each of the permanent magnets 66 is substantially encased by a cover 68. Each of the covers 68 is adapted to be mounted to the mounting surfaces 64 of the pole pieces 46 and 48 to secure one of the permanent magnets 66 thereon. Preferably, the covers 68 define a five sides box shape with an opening therein such that the permanent magnets are completely encased when the covers 68 are mounted onto the rotor assembly 38, as shown in FIG. 5. Alternatively, the covers 68 could include openings leaving portions of the permanent magnets exposed.

Preferably, each of the covers 68 includes a cavity 70 which is adapted to receive one of the permanent magnets 66 therein. The covers 68 further include tabs 72 extending from the sides. Preferably, the covers 68 are formed from plastic or from a non-magnetic metal, however it is to be understood, that the covers 68 could be made from any material which would not provide a magnetic conduit from the north end of the permanent magnet 66 to the south end of the permanent magnet 66. Additionally, the covers 68 could be made from a magnetic metal as long as the covers 68 were very thin. The thin magnetic covers 68 would provide a slight magnetic conduit which would reduce the efficiency of the alternator 42, but would otherwise work satisfactorily to secure the permanent magnets 66 onto the rotor assembly 38.

Figure 6:
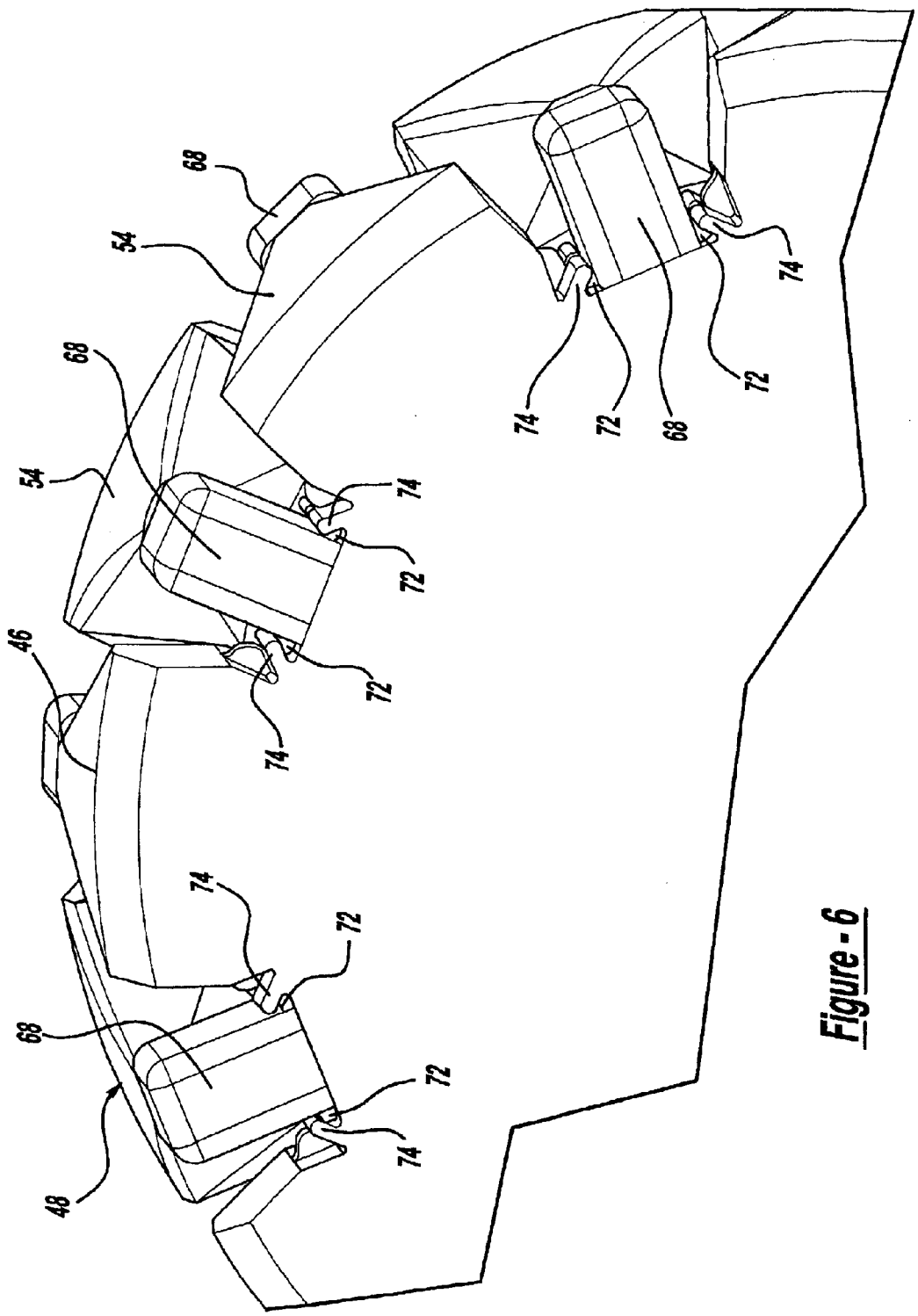
FIG. 6 is a partial end view of the rotor assembly showing the tabs of the cover and the ribs of the pole pieces which are staked over to secure the cover thereto.

The mounting surfaces 64 of the first and second pole pieces 46 are adapted to engage the tabs 72 of the covers 68. Preferably, a staking tool is used to plow the metal of the mounting surfaces 64 adjacent to the tabs 72 up and over onto the tabs 72 to secure the covers 68 in place. Alternatively, the mounting surfaces 64 of the first and second pole pieces 46 and 48 includes ribs 74 which are adapted to be staked over onto the tabs 72 to secure the cover 68 onto the surface 64 as shown in FIG. 6. The permanent magnets are held within the cavity 70 of the covers 68 and are thereby held onto the surfaces 64. The present invention could also be practiced wherein the covers 68 include deformable tabs which are staked between ribs formed in the mounting surfaces 64.

In the preferred embodiment, the permanent magnets 66 are held within the cavities 70 of the covers 68 by an adhesive. By using an adhesive, the amount of mechanical stress on the permanent magnets 66 due to vibration, mechanical loads, and other forces is reduced. Further, because the permanent magnet 66 is being held to the mounting surface 64 by the cover 68, tight tolerances of the permanent magnet 66 are not required.

Variances in the size and shape of the permanent magnet 66 can be compensated for by allowing clearance between the permanent magnet 66 and the cavity 70 of the cover 68. The clearance is filled with the adhesive when the permanent magnet 66 is placed within the cover 68. Therefore, the permanent magnets 66 can be made to lower tolerances and will not require expensive grinding operations to manufacture, thereby lowering the cost of the permanent magnets 66 significantly. An adhesive such as an epoxy is preferred, however, any adhesive suitable for the particular environment and conditions of the application could be utilized. Alternatively, the size of the permanent magnets 66 and the size of the cavities 70 within each of the covers 68 can be such that when a permanent magnet 66 is inserted within the cavity 70 of a cover 68, there is an interference fit therebetween which will frictionally hold the permanent magnet 66 into the cover 68.

The covers 68 will also provide protection for the permanent magnets 66. Typically the permanent magnets 66 are very brittle, and the covers 68 will help prevent the permanent magnets 66 from being damaged as well and keeping chips or dislodged pieces of the permanent magnets 66 from flying off the rotor assembly 42 when the rotor assembly 42 is rotating at high speed.

Figure 7:
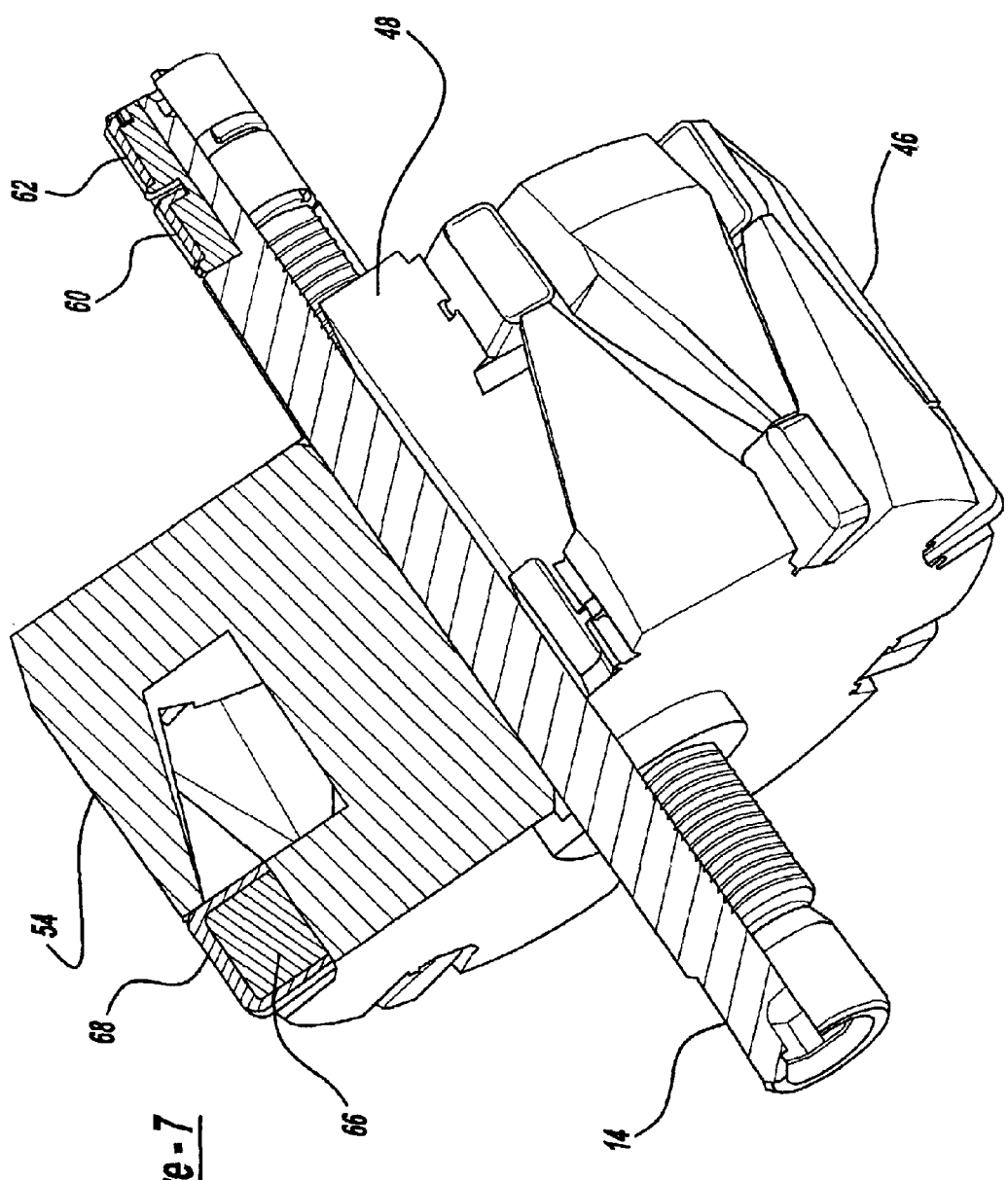
FIG. 7 is a partial sectional view of a first preferred embodiment where pole fingers do not extend over the covers.
Figure 8:
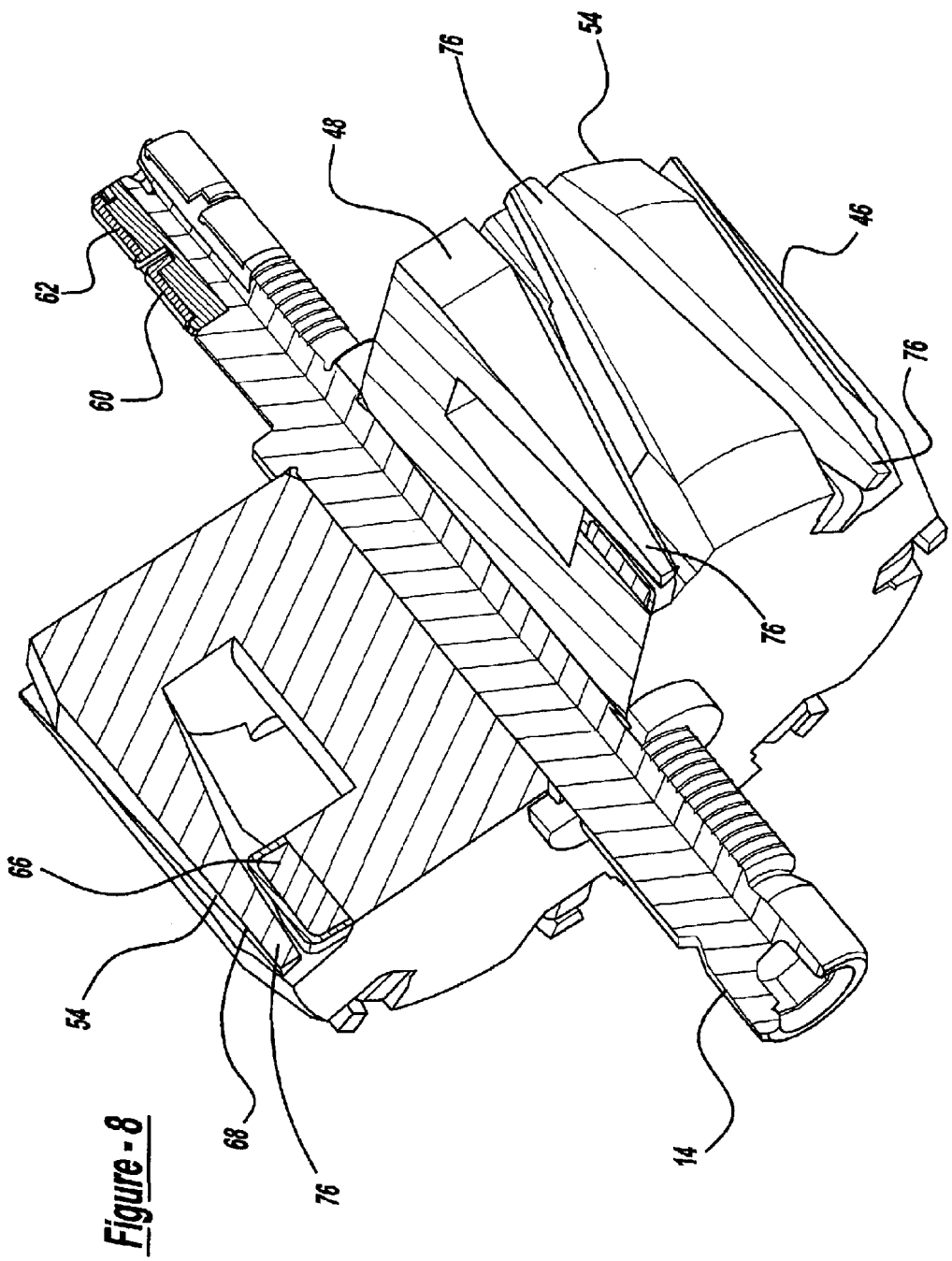
FIG. 8 is a partial sectional view of a second preferred embodiment where the pole fingers extend over and engage the covers.

Referring to FIG. 7, in the first preferred embodiment, the pole fingers 54 of the first and second pole pieces 46 and 48 do not extend over the mounting surfaces 64 of one another. Alternatively, as shown in FIG. 8, in a second preferred embodiment, the pole fingers 54' of each of the first and second pole pieces 46 and 48 extend over the mounting surfaces 64 of one another to engage the covers 68 placed thereon. The pole fingers 54' include distal ends 76 which will engage the covers 68 to provide additional force to hold the covers 68 to the mounting surfaces 64. The additional support of the pole fingers 54' will allow the covers 68 to be designed less robust, or out of a lighter and weaker material than if the pole fingers 54' were not providing the additional support.

The pole fingers 54' of the second preferred embodiment will provide additional protection for the permanent magnets 66 and the presence of the staked ribs 74 will prevent the covers 68 and permanent magnets 66 from putting outward stress on the pole fingers 54' which could cause the pole fingers 54' to deflect outward at high rotational speed of the assembly 42. Without the risk of deflection, the air gap between the rotor and stator can be reduced, thereby increasing the power density of the alternator 10.

It is to be understood, that the permanent magnet retention described in the present invention could also be utilized in with an electric machine having a pure permanent magnet rotor or with armatures that do not contain wound fields.

While the above description constitutes the preferred embodiments of the present invention, it will be appreciated that the invention is susceptible to modification, variation and change without departing from the proper scope and fair meaning of the accompanying claims

We claim:

1. A rotor assembly for an alternator comprising:
    an electrical wire defining an excitation winding;
    a first pole piece having a generally circular body defining an axis of rotation and an outer radial periphery;
    a plurality of pole fingers spaced radially about and extending axially from said outer radial periphery parallel to said axis of rotation;
    a plurality of permanent magnets positioned on said outer radial periphery;
    a plurality of covers, each of said covers being configured as a box shape and defining a cavity to substantially encase one of said permanent magnets therein and to be mounted to said outer radial periphery of said first pole piece to secure said permanent magnet to said first pole piece,
    each of said covers having at least two tabs extending circumferentially from two sides thereof.

2. The rotor assembly of claim 1 further comprising:
    a second pole piece having a generally circular body defining a center, and axis of rotation and an outer radial periphery, said axis of rotation of said second pole piece being coaxial with said axis of rotation of said first pole piece;
    a plurality of pole fingers spaced radially about said outer radial periphery of said second pole piece and extending axially from said outer radial periphery parallel to said axis of rotation;
    a plurality of permanent magnets positioned on said outer radial periphery of said second pole piece;
    a plurality of covers, each of said covers being configured as a box shape and defining a cavity to substantially encase one of said permanent magnets therein and to be mounted to said outer radial periphery of said second pole piece to secure said permanent magnet to said second pole piece,
    each of said covers having at least two tabs extending circumferentially from two sides thereof.

3. The rotor assembly of claim 2 wherein said first and second pole pieces each include a plurality of mounting surfaces spaced radially about said outer radial periphery between said pole fingers, wherein one of said plurality of permanent magnets is positioned on each of said mounting surfaces.

4. The rotor assembly of claim 3 wherein said mounting surfaces engaging said tabs to secure said covers, with said permanent magnets substantially encased therein, to said first and second pole pieces.

5. The rotor assembly of claim 4 wherein said mounting surfaces include ribs engaging said tabs to secure said covers, with said permanent magnets substantially encased therein, to said first and second pole pieces.

6. The rotor assembly of claim 5 wherein said ribs are staked over said tabs to secure said covers to said mounting surfaces.

7. The rotor assembly of claim 4 wherein each of said pole fingers of said first pole piece includes a distal end and extends between said pole fingers of said second pole piece, said distal ends being positioned over said mounting surfaces of said second pole piece and engaging said covers to further secure said permanent magnets onto said mounting surfaces.

8. The rotor assembly of claim 4 wherein each of said pole fingers of said second pole piece includes a distal end and extends between said pole fingers of said first pole piece, said distal ends being positioned over said mounting surfaces of said first pole piece and engaging said covers to further secure said permanent magnets onto said mounting surfaces.

9. The rotor assembly of claim 2 wherein said permanent magnets ar secured within said covers with an adhesive.

10. The rotor assembly of claim 2 wherein said permanent magnets are sized such that when said permanent magnets are inserted within said covers, there is an interference fit between said cover and said permanent magnet such that said permanent magnet is frictionally held within said cover.

11. The rotor assembly of claim 2 wherein said covers are made from a non-magnetic material.

12. A rotor assembly for an alternator comprising:

an electrical wire defining an excitation winding;

a first pole piece and a second pole piece, each having a generally circular body defining a center, an axis of rotation and an outer radial periphery;

a plurality of pole fingers spaced radially about and extending axially from said outer radial periphery of said first and second pole pieces parallel to said axis of rotation;

a plurality of mounting surfaces spaced radially about said outer radial periphery of said first and second pole pieces in between said pole fingers;

a plurality of permanent magnets positioned on said mounting surfaces of each of said first and second pole pieces;

a plurality of covers, each of said covers having tabs extending circumferentially from two sides thereof and being configured as a box shape and defining a cavity to substantially encase one of said permanent magnets therein, said mounting surfaces of said first and second pole pieces engaging said tabs to secure said covers, with said permanent magnets substantially encased therein, to said mounting surfaces.

13. The rotor assembly of claim 12 wherein each of said pole fingers of said first pole piece includes a distal end and extends between said pole fingers of said second pole piece, said distal ends being positioned over said mounting surfaces of said second pole piece and engaging said covers to further secure said permanent magnets onto said mounting surfaces.

14. The rotor assembly of claim 12 wherein each of said pole fingers of said second pole piece includes a distal end and extends between said pole fingers of said first pole piece, said distal ends being positioned over said mounting surfaces of said first pole piece and engaging said covers to further secure said permanent magnets onto said mounting surfaces.

15. The rotor assembly of claim 12 wherein said permanent magnets are secured within said covers with an adhesive.

16. The rotor assembly of claim 12 wherein said permanent magnets are sized such that when said permanent magnets are inserted within said covers, there is an interference fit between said cover and said permanent magnet such that said permanent magnet is frictionally held within said cover.

17. The rotor assembly of claim 12 wherein said covers are made from a non-magnetic material.

* * * * *

UNITED STATES PATENT AND TRADEMARK OFFICE
CERTIFICATE OF CORRECTION

PATENT NO. : 6,747,384 B2
DATED : June 8, 2004
INVENTOR(S) : Anthony Militello et al.

It is certified that error appears in the above-identified patent and that said Letters Patent is hereby corrected as shown below:

Column 6,
Line 60, before "secure within" delete "ar" and substitute -- are -- in its place.

Signed and Sealed this

Fourteenth Day of December, 2004

JON W. DUDAS
*Director of the United States Patent and Trademark Office*